United States Patent [19]

Kjos

[11] 3,866,722

[45] Feb. 18, 1975

[54] MECHANICAL DRAG BRAKE ASSEMBLY

[75] Inventor: Magne J. Kjos, 1748 La Granada Dr., Thousand Oaks, Calif. 91360

[73] Assignee: Burrough Corporation, Detroit, Mich.

[22] Filed: July 2, 1973

[21] Appl. No.: 375,456

[52] U.S. Cl. .................................. 188/75, 188/244
[51] Int. Cl. .............................................. F16d 49/16
[58] Field of Search ........... 188/56, 74, 75, 83, 166, 188/236, 238, 244, 249, 335, 340

[56] References Cited

UNITED STATES PATENTS

| | | | |
|---|---|---|---|
| 1,383,200 | 6/1921 | Gormley | 188/75 |
| 2,128,387 | 8/1938 | Wehr | 188/74 X |
| 2,862,582 | 12/1958 | Rose et al. | 188/75 |

*Primary Examiner*—Duane A. Reger
*Attorney, Agent, or Firm*—Gilbert H. Friedman; Benjamin F. Spencer; Nathan Cass

[57] ABSTRACT

A mechanical drag brake for use in the capstan drive portion of a magnetic tape transport system is disclosed for providing friction torque to a shaft coupled to the capstan to prevent the capstan from rotating when the capstan drive motor is de-energized. The drag brake consists of two substantially identical brake shoes with supporting members situated on opposite sides of the capstan shaft. The brake shoes are held in position to apply braking torque to the shaft by a spring intercoupling the support members. Each brake shoe is designed to be engaged by its supporting member in a manner which facilitates installation, repair, and self alignment about the shaft. The brake assembly is prevented from rotating about the shaft by a fixed pivot. The individual parts of the brake assembly are allowed to move with respect to each other over a limited range to assure physically aligned engagement of the brake shoes with the shaft.

8 Claims, 2 Drawing Figures

PATENTED FEB 18 1975

3,866,722

MECHANICAL DRAG BRAKE ASSEMBLY

BACKGROUND OF THE INVENTION

The present invention relates to mechanical drag brakes and, in particular, to an improved drag brake for use with the capstan shaft of a magnetic tape transport system.

In magnetic recording systems employing magnetic tape driven by a capstan, a problem exists when the motor driving the capstan has been de-energized during normal operation such as, for example, at the end of a reading sequence. Under these conditions, the capstan is stopped and should remain in a stationary angular position. With the motor then de-energized, the capstan and the drive shaft by which it is coupled to the motor is subject to rotation or drift due to any unbalance torque that exists or that inadvertently might be applied to the capstan. One example of this undersired drift or angular rotation of the capstan is that caused by the magnetic tape that passes over the capstan. In the conventional vertical tape transport system, two loops of the magnetic tape are located on opposite sides of the capstan, one loop of tape lying within a conventional vacuum chamber located below and to one side of the capstan and the other loop lying within a second vacuum chamber below and on the other side of the capstan. In addition to the two vacuum chambers, two pucker pockets or small vacuum chambers may be located on opposite sides of the capstan between the capstan and the main vacuum chambers. These pucker pockets may extend perpendicular to the direction of the two main loops of tape and they operate in the conventional manner to maintain the magnetic tape in contact with the capstan during normal operation by tending to equalize the opposing tensions in the tape. It has been found that when the capstan motor is de-energized after coming to a stop, that the amount of tape lying within the pucker pockets as well as within the two vacuum chambers can differ in length. Moreover, the amount of air pressure existing against the loops of tape to hold them in position can vary as between the two pucker pockets resulting in a difference in tension in the two loops. When this occurs, a small residual torque exists about the capstan causing the undesired rotation of the capstan and a shift in the tape. This shift leads to the undesired movement of the lineal position of the tape over the magnetic head at a time when it should remain stationary.

A number of solutions have been suggested to prevent these undesired drifts or rotations of the shaft of the capstan motor with the resulting shift of position of the tape over the magnetic head. One solution is to preload the bearings of the capstan motor so as to produce a controlled minimum level of friction sufficient to prevent rotation of the shaft when it should remain in a stationary position. Another possible solution has been to increase the spring pressure to the electrical brushes in those capstan motors of the universal type to provide an increased drag of the electrical brushes upon the commutator of the motor, and hence upon the shaft. Yet another suggestion has been to apply static braking to the shaft by means of a magnetic field, either by the use of permanent magnets or by means of an electromagnetic coil.

These methods have not been found entirely satisfactory for the solution of the problem. Attempts at preloading the bearings of the serveral different types of capstan motors in use are difficult to control in production and no suitable means is known for insuring that the particular amount of drag required can be set and held for any appreciable length of time. Capstan motor manufacturers have sought to design their motors with the best bearings possible in order to reduce friction and, thereby, insure long life. Increasing the electrical brush pressure upon the commutator of the universal type capstan motors results in increased mechanical wear of the electrical brushes and is unacceptable in view of the required long life needed for the brushes of capstan motors. The use of permanent magnets or electromagnetic fields to achieve drag upon the shaft of a capstan motor is undesirable where such magnetic field might cause pre-biasing or distortion of the magnetic tape. Moreover, if the use of a magnetic field were to require a disk or drag cup to be attached to the shaft of the capstan motor, an increase in inertia would result which would be unacceptable in tape transport systems. Additionally, the requirement that the amount of drag needed must be accurately set has ruled out this solution.

The requirements of long life, low cost, and ease of mass production of the means to prevent undesired drift of a capstan and the necessity that such means must be operable with a variety of types of capstan motors without adding inertia to the shaft has led to the improved drag brake of the present invention.

Accordingly, it is a principal object of the present invention to provide a simple, low-cost, and long life drag brake capable of self-alignment about the shaft.

It is another object of the invention to provide a drag brake assembly adapted for easy installation about the shaft of a motor.

A further object of the invention is to provide a drag brake assembly in which the brake shoes are interlocked with their mating brake shoe support members without permanent attachment thereto for providing both self-alignment and ease of replacement of the brake shoe.

Still another object is to provide a drag brake assembly capable of being supported relative to a fixed pivot point in such manner as to provide self-alignment of the brake shoes about the shaft upon which the braking force is to be applied.

BRIEF DESCRIPTION OF THE INVENTION

The drag brake of the present invention consists of two substantially identical brake shoes supported, respectively, by two brake shoe support members, the brake shoes being situated on opposite sides of a shaft and being held in position by a main spring. The brake shoes are designed for interlocking with their supporting brake shoe members for ease of installation or repair. The brake assembly is prevented from rotation about the shaft by means of a fixed pivot while being allowed to move about in a plane perpendicular to the axis of the shaft over a limited region to secure physical self-alignment of the brake shoes about the shaft. An auxiliary spring provides a fine or vernier adjustment of the amount of force that the brake applies to the shaft both for initially setting the braking force to a predetermined desired value as well as providing for future adjustment as the brake shoes wear.

THE DRAWINGS

DETAILED DESCRIPTION OF THE INVENTION

Figure 1:
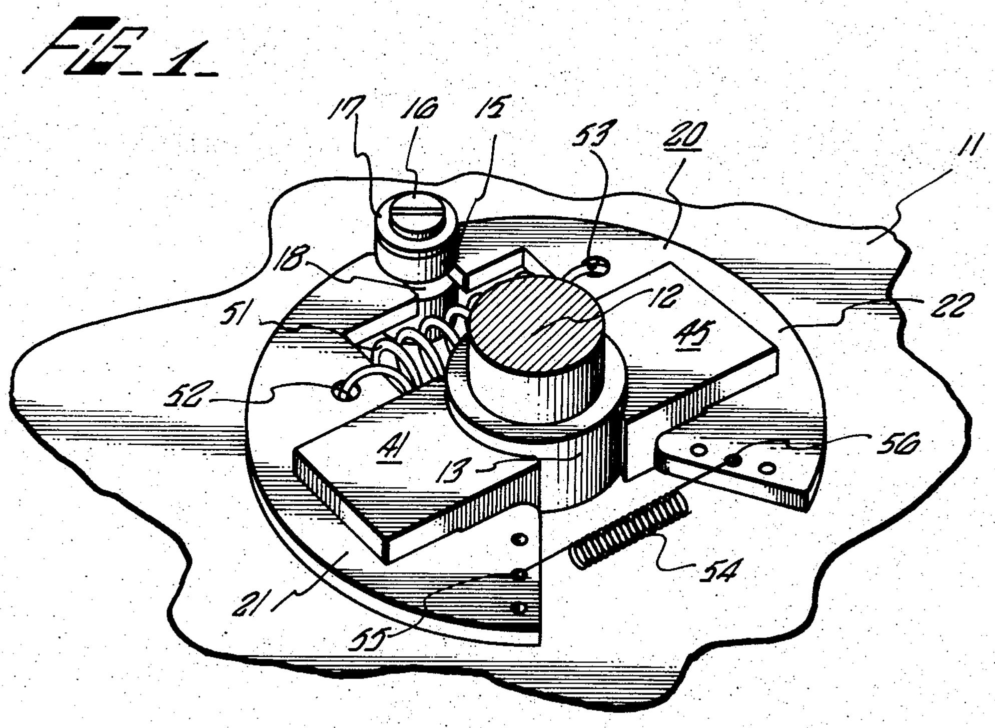
FIG. 1 illustrates, in perspective, the improved drag brake assembly in accordance with the invention mounted about the shaft of a capstan motor.

Referring to FIG. 1, one end of a conventional capstan motor 11 having an extending cylindrical shaft 12 with an enlarged portion 13 is shown with the improved drag brake assembly 20 mounted in position to provide the desired braking force upon the shaft. The capstan, not shown, is normally affixed to the upper end of shaft 12.

A pivot 15, in the shape of a spool, is mounted upon the end of motor 11 at a fixed position along a radial line relative to shaft 12, as shown, by means of a screw 16 and lock washer 17. Pivot 15 prevents the drag brake assembly 20 from rotating as the shaft 12 turns and, additionally, provides a flat surface 18 elevated above the end of the motor 11 upon which the drag brake assembly can slideably bear to physically self-align itself about the enlarged shaft portion 13.

Figure 2:
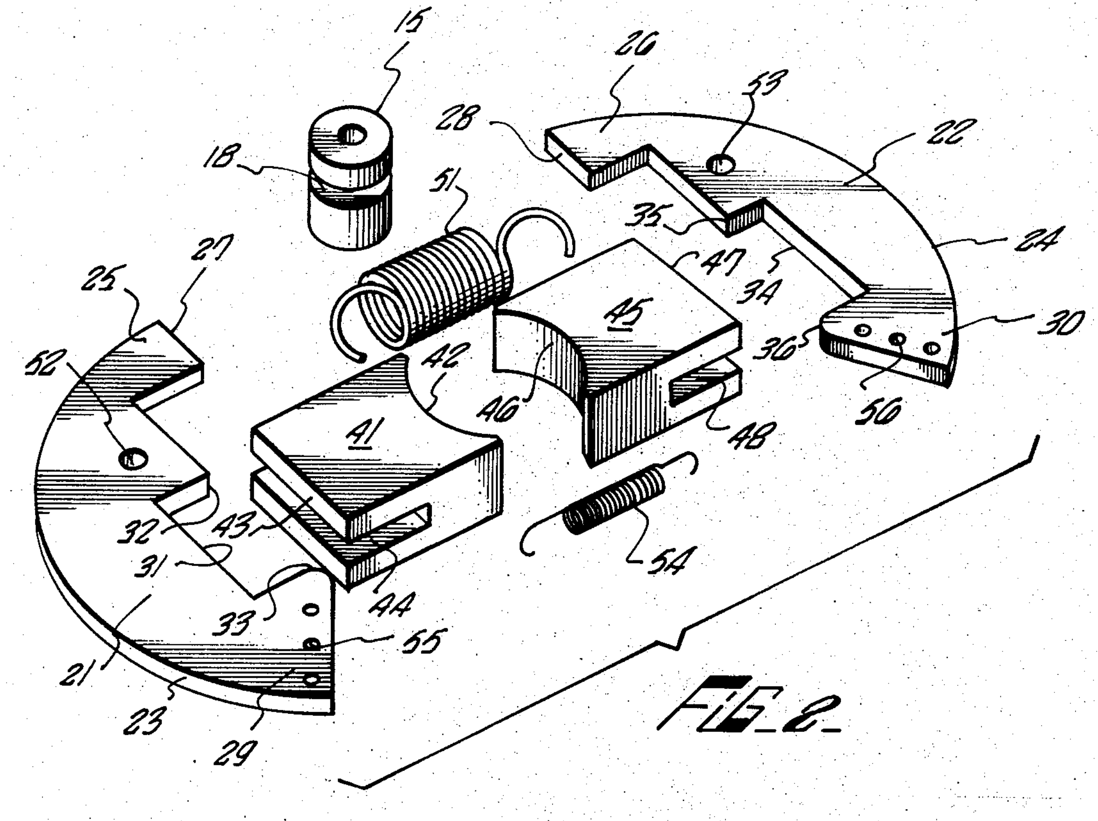
FIG. 2 is an exploded view of the elements of the improved drag brake of the invention.

The exploded view of the elements of the drag brake in FIG. 2 shows pivot 15 with flat surface 18 in better detail. The drag brake consists of first and second brake shoe support members 21, 22 in the form of flat strips and shaped as shown with circular outer peripheries 23, 24. The first end 25 of support member 21 and the first end 26 of support member 22 are provided with flat portions 27, 28 respectively, which serves as a pivot bearing surfaces to bear slideably between the flanges of the spool shaped pivot 15 and on flat surface 18.

The second end 29 of support member 21 and the second end 30 of support member 22 are each provided with three holes located approximately along a radial line from shaft 12, as illustrated, for reasons which will be described hereinafter.

A rectangular cut-out or notched portion 31 is located intermediate or between the first and second ends 25, 29 and along the inside edge of support member 21. The notched portion 31 extends in a direction perpendicular to a radial line passing through the axis of the shaft 12. The ends of the notched portion 31 are defined by corners 32, 33. A similar notched portion 34 is located along the inside edge of support member 22 between ends 26 and 30. Notched portion 34 extends between corners 35, 36.

A first brake shoe 41 of rectangular cross section is provided with face 42 contoured to match and physically engage the cylindrical surface of the enlarged portion 13 of shaft 11. The rear end 43 of brake shoe 41 opposite contoured face 42 is a bearing end provided with a slotted groove portion 44 lying in a plane perpendicular to the axis of shaft 12. As can be seen in FIG. 1, slotted groove portion 44 is of sufficient depth to permit the first brake shoe 41 to straddle brake shoe support member 21 over the flat surfaces of the region of the support member adjacent notched portion 31. When brake shoe 41 is properly fitted on support member 21, it extends within the notched portion 31 between corners 32, 33 in an overlapping or interlocking fashion.

Second brake shoe 45 with its contoured face 46 matching the cylindrical surface 13 is identical to first brake shoe 41. Its bearing end 47 is provided with slotted groove portion 48 to enable it to straddle brake shoe support member 22. When properly fitted, brake shoe 45 extends within the notched portion 34 between corners 35 and 36.

In the preferred embodiment of the invention, the notched portions 31 and 34 of brake shoe support member 21 and 22 are rectangular cut-outs as illustrated. By selecting the length of these notched portions to be just slightly longer than the width of the brake shoes 41 and 45, the brake shoes may be fitted upon the support members in an interlocking arrangement. This enables the brake shoes to be assembled upon the brake shoe support members without the requirement of a special tool. Since the brake shoes are not permanently attached to the brake shoe support members, the replacement of a brake shoe upon the brake shoe support member, when necessary, can be done with ease.

The two brake shoes with their brake shoe support members are held in position about shaft 12 by a main spring 51 in tension coupled between holes 52 and 53 located in the brake shoe support members. As illustrated in FIG. 1, the flat portions 27 and 28 of the first and second brake shoe support members engage and react against the pivot 15 with a portion of the first ends 25 and 26 resting upon the flat surface 18 of the pivot. The extended main spring 51 provides a sufficient force due to the tension therein to retain the brake assembly in position while providing a desired minimum of braking force upon the enlarged cylindrical portion 13 of shaft 12.

The brake shoes may be constructed of any suitable material for producing the relatively small amount of braking desired and dissipating the heat generated. While certain types of wood are suitable, a composite material consisting primarily of carbon with a suitable binder has been preferred. One type of material found suitable is Grade P-9-J carbon manufactured by Pure Carbon Company, St. Marys, Pa. Another material known in the trade as "Fluoroloy" C and available from The Flurocarbon Company, Santa Ana, Calif. also has been found acceptable.

A small auxiliary spring 54 in tension situated on the opposite side of shaft 12 from main spring 51 is coupled between a pair of holes 55 and 56 located, respectively in the second ends 29, 30 of support members 21, 22. This small spring 54 provides a fine adjustment of the amount of braking force applied by the brake to shaft 12. In one model of the brake, a torque of approximately three to four inch-ounces is applied to the shaft when small spring 54 is located between the two innermost holes closest to the shaft while a torque of approximately seven to eight inch-ounces is applied to the shaft by the brake when small spring 54 is intercoupled between the two outer-most holes. For normal braking, the small spring is positioned between a selected pair of holes to produce approximately four to five inch-ounces of torque on the enlarged cylindrical portion 13 of shaft 12. This small amount of braking has been found sufficient to prevent the undesired drift of the shaft 12 when the capstan motor 11 is stopped without adversely affecting the speed of the capstan motor during normal operation.

A feature of the improved drag brake of this invention is its ability to physically self-align the brake shoes about the shaft 12 in the plane perpendicular to the axis of the shaft. This feature insures even wear of the brake shoes and the long life desired. Self alignment is achieved by movement of the entire drag brake assembly toward or away from pivot 15 and, when necessary, by the movement or displacement of the individual brake shoe supporting members relative to each other until the faces of the brake shoes properly match and physically engage the cylindrical surface of the enlarged portion 13. This movement changes the point of contact of the pivot bearing surfaces or flat portions 27, 28 of brake shoe support members 21, 22 with pivot 15. By selecting the length of the flat portion 27, 28 to be greater than the length normally required for self alignment, an additional advantage is achieved with the improved drag brake of this invention. This advantage is that the tolerance necessary in locating the position of the pivot 15 on the upper surface of the capstan motor 11 relative to the center of the shaft 12 does not have to be as closely held as would otherwise be the case if the entire brake assembly was mounted in a fixed position relative to the pivot 15.

Self alignment is achieved in yet another manner with this invention. By selecting the lengths of the rectangular cut-outs or notched portions 31, 34 to be greater than the width of the brake shoes, the brake shoes can be shifted and linearly displaced along the notched portions in a direction perpendicular to a radial line from the shaft to achieve proper alignment of the brake shoes relative to the shaft. With this arrangement, the brake shoes are individually slideable back and forth along the notched portions 31, 34 thus allowing the brake shoe support members to remain in a relatively fixed position.

The entire brake assembly 20 is capable of being tilted relative to the axis of pivot 15 over a relatively small angle by virtue of the clearance space existing between the ends 25, 26 adjacent flat portions 27, 28 and the flange portions of pivot 15. This clearance space if sufficient to allow self alignment of the brake assembly about the shaft in the event the axis of the pivot is not exactly parallel with the axis of the shaft.

The drag brake assembly of this invention is not limited to the preferred embodiment illustrated. Where the self alignment is achieved by movement of the flat portions 27, 28 of the brake shoe support members 21, 22 relative to pivot 15, a different type of shape for the notched portions 31 and 34 may be employed. It is evident that a V-shaped notched portion could be employed in the brake shoe supporting members with a corresponding matching slotted section in the brake shoes without departing from the scope of the invention. Alternatively, a different pivot system could be provided for each brake shoe support member with self alignment being achieved by the individual movement of each brake shoe relative to their brake shoe support member.

Since many changes can be made in the above-described apparatus and many different embodiments of this invention could be made without departing from the scope thereof, it is intended that all matter contained in the above description or shown in the accompanying drawing shall be interpreted as illustrative and not in a limiting sense.

What is claimed is:

1. A drag brake assembly adapted for mounting in a position to provide braking force upon a cylindrical shaft comprising in combination:

a. a first brake shoe support member in the form of a flat strip having first and second ends;

b. a first brake shoe having a contoured face shaped to engage the surface of said cylindrical shaft, the end opposite the contoured face of said first brake shoe having a slotted groove portion in a plane perpendicular to the axis of the shaft, said first brake shoe being located upon said first brake shoe support member intermediate the first and second ends with the slotted groove portion of said brake shoe straddling said first brake shoe support member, the walls of the slotted groove portion overlapping the flat surfaces of said first brake shoe support member;

c. a second brake shoe support member substantially identical to said first brake shoe support member;

d. a second brake shoe substantially identical to said first brake shoe; and e. means for holding said first brake shoe support member with its first brake shoe and said second brake shoe support member with its second brake shoe in a position about the cylindrical shaft, said first and second brake shoes being relatively movable with respect to each other over a limited range in a plane perpendicular to the axis of the shaft to assure that the contoured faces physically engage the surface of said shaft.

2. The drag brake assembly as defined by claim 1 wherein said first brake shoe support member includes a first rectangular notched portion located along the inside edge of said first brake shoe support member facing the cylindrical shaft for locating the position of the first brake shoe relative to the first and second ends, and wherein said second brake shoe support member includes a second rectangular notched portion located along the inside edge of said second brake shoe support member facing the cylindrical shaft for locating the position of the second brake shoe relative to the first and second ends, the length of said first and second rectangular notched portions being greater than the length of the slotted groove portions of said first and second brake shoes to permit limited movement of said first and second brake shoes, respectively, within said first and second rectangular notched portions.

3. The drag brake assembly as defined by claim 1 wherein said means for holding said first brake shoe support member with its first brake shoe and said second brake shoe support member with its second brake shoe in a position about the cylindrical shaft includes a flat portion at the first ends of each of said first and second brake shoe support members physically engaging a pivot located at a fixed position relative to the cylindrical shaft, said flat portions extending substantially parallel to a radial line from the center of the shaft through the center of the pivot.

4. The drag brake assembly as defined by claim 1 wherein said means for holding said first brake shoe support member with its first brake shoe and said second brake shoe support member with its second brake shoe in a position about the cylindrical shaft includes a main spring coupled between said first and second brake shoe support members near their first ends, a second spring coupled between said first and second brake shoe support members near their second ends, said second and main springs being located on opposite sides of the cylindrical shaft, and means located near the second end of one of said first or second brake shoe support members for adjusting the braking force provided by said second spring.

5. A drag brake assembly adapted for self-aligning mounting to provide braking force upon a cylindrical shaft comprising in combination:
a. a first brake shoe having a contoured face shaped to engage the surface of said cylindrical shaft and a bearing end opposite the contoured face;
b. a first brake shoe support member having first and second ends and an intermediate portion between the first and second ends, the intermediate portion of said support member and the bearing end of said first brake shoe being arranged in interlocking relationship, free of attachment therebetween;
c. a second brake shoe substantially identical to said first brake shoe;
d. a second brake shoe support member substantially identical to said first brake shoe support member; and
e. spring means connected between said first and second brake shoe support member for holding said first brake shoe support member with its first brake shoe and said second brake shoe support member with its second brake shoe in a position about the cylindrical shaft, said support members being relatively rotatable and translatable over a limited range with respect to each other.

6. A drag brake assembly adapted for self-aligning mounting to provide braking force upon a cylindrical shaft comprising in combination:
a. a first brake shoe having a contoured face shaped to engage the surface of said cylindrical shaft and a bearing end opposite the contoured face;
b. a first brake shoe support member having first and second ends and an intermediate portion between the first and second ends, the intermediate portion of said support member and the bearing end of said first brake shoe being arranged in interlocking relationship, free of attachment therebetween, the interlocking relationship permitting limited linear displacement of said first brake shoe support member with respect to said first brake shoe along a line perpendicular to a radial line of the cylindrical shaft;
c. a second brake shoe substantially identical to said first brake shoe;
d. a second brake shoe support member substantially identical to said first brake shoe support member; and
e. spring means connected between said first and second brake shoe support members for holding said first brake shoe support member with its first brake shoe and said second brake shoe support member with its second brake shoe in a position about the cylindrical shaft.

7. A drag brake assembly adapted for self-aligning mounting to provide braking force upon a cylindrical shaft, the shaft being rotatable with respect to adjacent structure, comprising in combination:
a. a first brake shoe having a contoured face shaped to engage the surface of said cylindrical shaft and a bearing end opposite the contoured face;
b. a first brake shoe support member having first and second ends, an intermediate portion between the first and second ends, and a pivot bearing surface adjacent the first end, the intermediate portion of said support member and the bearing end of said first brake shoe being arranged in interlocking relationship, free of attachment therebetween;
c. a second brake shoe substantially identical to said first brake shoe;
d. a second brake shoe support member substantially identical to said first brake shoe support member;
e. spring means connected between said first and second brake shoe support members for holding said first brake shoe support member with its first brake shoe and said second brake shoe support member with its second brake shoe in a position about the cylindrical shaft; and
f. pivot means fixed to the adjacent structure and extending therefrom for slideably bearing against the pivot bearing surfaces of said first and second brake shoe support members, said pivot means and the pivot bearing surfaces being so constructed and arranged as to permit both rotating and translating displacement of said support members with respect to said pivot means.

8. A drag brake assembly as recited in claim 7 wherein said pivot means and the pivot bearing surfaces of said first and second brake shoe support members are so constructed and arranged as to permit both rotating and translating displacement of said first and second brake shoe support members with respect to each other.

* * * * *